(12) United States Patent
Fuchs et al.

(10) Patent No.: US 11,204,269 B2
(45) Date of Patent: Dec. 21, 2021

(54) FLUID METER WITH A FLUID HOUSING AND METHOD FOR PRODUCING A FLUID HOUSING

(71) Applicants: Buerkert Werke GmbH & Co. KG, Ingelfingen (DE); Burkert S.A.S., Triembach-au-Val (FR)

(72) Inventors: Yannick Fuchs, Ingelfingen (DE); Yves Hoog, Ingelfingen (DE)

(73) Assignees: Buerkert Werke GmbH & Co. KG, Ingelfingen (DE); Burkert S.A.S., Triembach-au-Val (FR)

( * ) Notice: Subject to any disclaimer, the term of this patent is extended or adjusted under 35 U.S.C. 154(b) by 142 days.

(21) Appl. No.: 16/581,974

(22) Filed: Sep. 25, 2019

(65) Prior Publication Data
US 2020/0096372 A1    Mar. 26, 2020

(30) Foreign Application Priority Data
Sep. 25, 2018  (FR) ..................... 18/58705

(51) Int. Cl.
*G01F 1/66*     (2006.01)
*G01F 15/14*    (2006.01)
*G01F 15/18*    (2006.01)
*G01D 11/24*    (2006.01)
*G01F 15/00*    (2006.01)

(52) U.S. Cl.
CPC ........... *G01F 1/662* (2013.01); *G01D 11/245* (2013.01); *G01F 15/14* (2013.01); *G01F 15/18* (2013.01); *G01F 15/006* (2013.01)

(58) Field of Classification Search
CPC .......... G01F 1/662; G01F 15/14; G01F 15/18; G01F 15/006; G01D 11/245
See application file for complete search history.

(56) References Cited

U.S. PATENT DOCUMENTS

| 4,735,097 A   | 4/1988  | Lynnworth |
|---|---|---|
| 4,838,127 A   | 6/1989  | Herremans et al. |
| 6,418,796 B1* | 7/2002  | Baumoel ................. G01F 1/662 73/861.27 |
| 6,609,430 B1  | 8/2003  | Joshi et al. |
| 7,287,436 B2* | 10/2007 | Lang ....................... G01F 1/662 73/861.25 |

(Continued)

FOREIGN PATENT DOCUMENTS

| CN | 102147274 A | 8/2011 |
|---|---|---|
| DE | 19729473 A1 | 2/1999 |

*Primary Examiner* — Benjamin R Schmitt
(74) *Attorney, Agent, or Firm* — Dilworth IP, LLC

(57) ABSTRACT

Fluid meter with a fluid housing and a method for manufacturing the fluid housing, which comprises a fluid inlet, a fluid outlet and a fluid channel, which extends between the fluid inlet and the fluid outlet and which is fluidically coupled to the fluid inlet and the fluid outlet, wherein the fluid housing has a side facing the fluid channel, to which a fluid-measuring module is assigned, which is in direct contact with a fluid flowing through the fluid channel at a fluid-side interface, wherein the fluid-measuring module is surrounded by the fluid housing, and wherein the fluid-measuring module is equipped to generate surface acoustic waves which propagate along the fluid-side interface of the fluid-measuring module.

18 Claims, 4 Drawing Sheets

(56) References Cited

U.S. PATENT DOCUMENTS

2007/0062305 A1* 3/2007 Muller .................... G01F 1/667
 73/861.28
2012/0272750 A1 11/2012 Fujii et al.
2016/0305805 A1* 10/2016 Baumoel ................. G01F 1/663
2019/0025112 A1* 1/2019 Ploss .................... G01N 29/032

* cited by examiner

FLUID METER WITH A FLUID HOUSING AND METHOD FOR PRODUCING A FLUID HOUSING

FIELD OF THE DISCLOSURE

Embodiments of the present disclosure relate to a fluid meter with a fluid housing. Further, embodiments of the present disclosure relate to a method for producing a fluid housing.

BACKGROUND

In the state of the art fluid meters are known which are used in systems in order to determine a flow of a fluid through a fluid-measuring channel. In general, the fluid meter used should be formed as compact and robust as possible, thus should require little installation space and be largely maintenance-free. Moreover, it is advantageous if the fluid meter is as universally usable as possible and in particular if different fluids can be used or also different properties of the fluids can be determined.

The fluid meters can, among other things, operate with ultrasonic measuring devices, for which the fluid meters usually have fittings in the fluid-measuring channel. However, the flow of the fluid through the fluid-measuring channel is impaired by the fittings, and pressure losses are generated, with the result that the measurement of the flow of the fluid is disrupted. In addition, the fluid-measuring channel, because of the fittings, and the fittings themselves are difficult to clean.

Fluid meters which utilize surface acoustic waves (SAWs) to determine the flow of the fluid through the fluid-measuring channel are also known from the state of the art. For this, the surface acoustic waves are excited in an acoustic waveguide, in particular by means of an acoustic signal transformer, and partially coupled out into the fluid flowing through the fluid channel and from that coupled back into the waveguide. For this, the frequency of the surface acoustic waves is chosen correspondingly suitably, with the result that some of the surface waves are coupled out of the waveguide and propagate through the fluid as a bulk wave at least in sections. The interference between the surface acoustic wave and the bulk wave coupled back in gives a characteristic signal, which is evaluated in order to determine properties of the fluid. For example, the time response and the intensity of the characteristic signal, in particular the temporal intensity gradient including the time lag, allow conclusions among other things as to characteristic properties of the fluid, such as sound velocity, temperature, homogeneity, flow rate, flow, concentration or viscosity. Nevertheless, such fluid meters based on surface acoustic waves are very elaborate to produce, and as a result are expensive. This is due in particular to the fact that the acoustic signal transformer must be sealed vis-à-vis the fluid-measuring channel, as it must be brought as close as possible to the fluid in order to couple the bulk wave in.

The object of the present disclosure is to provide a convenient and easy-to-produce fluid meter, with which characteristic properties of the fluid can be determined on the basis of surface acoustic waves.

SUMMARY

To achieve the object, a fluid meter is provided according to the present disclosure, with a fluid housing, which comprises a fluid inlet, a fluid outlet and a fluid channel, which extends between the fluid inlet and the fluid outlet and which is fluidically coupled to the fluid inlet and the fluid outlet, wherein the fluid housing has a side facing the fluid channel, to which a fluid-measuring module is assigned, which is in direct contact with a fluid flowing through the fluid channel at a fluid-side interface, wherein the fluid-measuring module is surrounded by the fluid housing, and wherein the fluid-measuring module is equipped to generate surface acoustic waves which propagate along the fluid-side interface of the fluid-measuring module.

Also provided according to the present disclosure is a method for producing a fluid meter, with the following steps:
  placing a fluid-measuring module in an injection mould, and
  injection-moulding around the fluid-measuring module in order to form a fluid housing of the fluid meter having a fluid channel, with the result that the fluid-measuring module is surrounded by the fluid housing.

The present disclosure is based on the basic idea that a cost-effective fluid meter based on surface acoustic waves can be provided which is formed compact and robust, as the fluid-measuring module is surrounded by the fluid housing, thus is integrated or embedded in the fluid housing. This is ensured easily, in that the fluid meter is produced in an injection mould by injection-moulding around the fluid-measuring module placed in the injection mould such that the fluid housing having the fluid channel is formed, by which the fluid-measuring module is then surrounded (in a material-bonding manner). A durable seal of the fluid-measuring module inside the fluid housing is guaranteed hereby. Due to the direct placement of the fluid-measuring module in the injection mould and the injection-moulding around the fluid-measuring module to produce the fluid housing, the fluid meter is correspondingly convenient to produce, as an elaborate sealing of the fluid-measuring module is dispensed with.

In other words, the fluid-measuring module can be a fluid-measuring module inlay. This is because, during the production of the fluid meter, the fluid-measuring module was first placed in the injection mould and then injection-moulding was carried out around it in such a way that the fluid-measuring module is surrounded (in a fluid-tight manner) by the thus-produced fluid housing, thus is embedded or integrally accommodated.

The fluid-side interface can be formed by a side of the fluid-measuring module facing the fluid channel. In other words, the fluid-measuring module is in direct contact with the fluid flowing through the fluid channel via this side.

In principle, the fluid-measuring module, which is in direct contact with a fluid flowing through the fluid channel at a fluid-side interface and is equipped to generate surface acoustic waves, is a so-called SAW module. With the fluid-measuring module formed as a SAW module, the properties of the fluid can easily be measured, as the surface waves propagate, firstly, as surface waves along the fluid-side interface of the fluid-measuring module and, secondly, as bulk waves through the fluid, as is usual in a SAW module. The surface waves along the interface and the bulk wave coupled back in generate a characteristic interference signal, which can be evaluated in order to determine corresponding properties of the fluid.

Accordingly, it can be provided that the fluid-measuring module has at least one acoustic signal transformer, which is equipped to emit and/or measure the surface wave and a bulk wave. Some of the energy of the surface wave is coupled out and a bulk wave forms which propagates at least partially through the fluid to be measured. The surface wave and the bulk wave excited hereby in the fluid are therefore generated by the acoustic signal transformer. The acoustic signal transformer makes a cost-effective generation and measurement of the surface waves and the bulk waves (coupled back in) possible.

In particular, the bulk wave has at least one reflection point on an internal wall of the fluid channel, with the result that the bulk wave passes through the fluid at least twice, thus multiple times. The course of the bulk wave in the fluid can hereby be correspondingly extended. The interference from the surface wave and the bulk wave, thus the interference signal, can be measured by the acoustic signal transformer. The interference or the interference signal can in addition be evaluated in order to determine characteristic properties of the fluid.

An evaluation unit or electronics can be provided to evaluate the interference or the interference signal. The evaluation unit or electronics can also be provided to excite the surface acoustic waves. The evaluation unit or electronics are housed in an electronics housing, in particular formed separately. In addition, the evaluation unit or electronics are coupled to the at least one acoustic signal transformer, in order to initiate the excitation of the surface acoustic waves via the acoustic signal transformer or to obtain the interference signal received by the acoustic signal transformer, in order to be able to evaluate it.

In addition, an electrical interface, via which the fluid meter can be electrically contacted, can be provided on the electronics housing. The electrical interface is in particular electrically coupled to the evaluation unit or electronics. The data or signals made available by the evaluation unit or electronics can be correspondingly picked up or external actuation signals can be obtained via the electrical interface.

The electronics housing can be formed during the production of the fluid housing, in particular wherein the electronics housing and the fluid housing are formed at the same time. In other words, the electronics housing and the fluid housing can be formed in one piece or material-bonded with each other.

According to an embodiment of the present disclosure, it is provided that the fluid-measuring module has a cavity, in which the acoustic signal transformer is arranged. The cavity makes a targeted coupling-in of the surface wave possible and prevents unnecessary signal losses. In particular, the cavity adjoins the fluid-side interface, with the result that it decouples the correspondingly assigned side of the fluid-measuring module from other sides or walls of the fluid-measuring module in terms of vibration technology.

A vacuum/negative pressure can be present in the cavity. The cavity can also be filled with a gas or gas mixture, for example air, in order to provide the desired properties.

The fluid-measuring module can be formed in several pieces, in particular in two pieces, with the result that a cavity forms during the formation of the fluid-measuring module. For example, the fluid-measuring module comprises a (pot-shaped) base body and a cover which form the cavity in the assembled or prefabricated state.

It can be provided that the fluid-measuring module, in particular the base body, has a reduced wall thickness in the area of the acoustic signal transformer. In particular, it is provided that the wall thickness is 40 to 60%, preferably 50%, of the wavelength of the surface acoustic wave. With this wall thickness of the fluid-measuring module, the surface waves are particularly well coupled in by the acoustic signal transformer. The reduced wall thickness relates to the side or wall of the fluid-measuring module assigned to the fluid-side interface, thus the wall of the fluid-measuring module which forms the fluid-side interface.

According to an embodiment of the present disclosure, it can be provided that the fluid-measuring module has a metallic base body. The propagation of the surface wave in the metallic base body is particularly low-loss, and thus wide measuring sections or propagation courses can also be utilized in order to measure the properties of the fluid, whereby the measurement precision increases. The bulk waves in the fluid can also be excited easily via the metallic base body.

In particular, the metallic base body comprises the fluid-side interface of the fluid-measuring module. As a result, the fluid-measuring module contacts the fluid flowing through the fluid channel via the metallic base body.

The at least one acoustic signal transformer is arranged in particular on the metallic base body, namely on the side of the metallic base body opposite the fluid-side interface.

It can be provided that the fluid housing is manufactured from a plastic, in particular is an injection-moulded part. Plastic parts are particularly convenient to produce, with the result that the fluid housing can be produced cost-effectively. In addition, complex geometries can be produced easily and cost-effectively in an injection-moulding process.

In a preferred embodiment, it can be provided that the fluid-measuring module is accommodated in a fluid-tight manner in the fluid housing, in particular the latter is injection-moulded around it. As the fluid-measuring module is accommodated in a fluid-tight manner, the acoustic signal transformer is protected against damage due to fluid entering. As already explained, the fluid-tight accommodation of the fluid-measuring module easily results from the injection-moulding around the fluid-measuring module with the plastic forming the fluid housing, with the result that the fluid-measuring module is embedded in the fluid housing.

As the fluid-measuring module is in direct contact with the fluid flowing through the fluid channel, a fluid-tight accommodation is important.

In addition, it can be provided that a reflector insert and/or a further fluid-measuring module are or is provided on the side of the fluid channel opposite the fluid-measuring module, in particular wherein the reflector insert and/or the further fluid-measuring module are or is also surrounded by the fluid housing. The reflector insert reflects the bulk wave, with the result that the reflector insert prevents the bulk wave generated from being at least partially coupled into the fluid housing, whereby the measurement would become correspondingly imprecise. In other words, the reflector insert provides the at least one reflection point for the bulk wave. Via the reflector insert, the course of the bulk wave can be extended, whereby the characteristic properties of the fluid can be determined with a higher degree of precision. The reflector insert can be manufactured from a metallic material, in particular with a relatively large wall thickness, in order to achieve the desired reflection properties.

The further fluid-measuring module can be formed as a receiver and/or transmitter, wherein the further fluid-measuring module cooperates with the fluid-measuring module. The characteristic properties of the fluid can thus also be determined more precisely, as a redundant measurement is possible, in particular starting from opposite sides of the fluid channel.

The reflector insert and/or the further fluid-measuring module are or is also surrounded by the fluid housing, in particular embedded (in a fluid-tight manner) in the fluid housing. For example, the reflector insert and/or the further fluid-measuring module are/is first placed in the injection mould during the production of the fluid meter and then the plastic forming the fluid housing is injection-moulded around them/it. In this respect, the reflector insert and/or the further fluid-measuring module are likewise integrated in the fluid housing.

It can be provided that the fluid-measuring module, together with the opposite reflector insert and/or the further fluid-measuring module, forms a channel-like insert unit, in particular wherein the fluid-measuring module is connected to the reflector insert and/or the further fluid-measuring module by two side walls. The channel-like insert unit is therefore formed in one piece. The channel-like insert unit is, for example, inserted in the injection mould and then the plastic forming the fluid housing is injection-moulded around it. This makes it possible to manufacture the fluid meter easily and cost-effectively.

If there is no channel-like insert unit present, the fluid-measuring module and the reflector insert or the further fluid-measuring module can be placed in the injection mould individually at the provided locations, wherein they are then at the same time surrounded with the plastic forming the fluid housing, thus the latter is injection-moulded around them.

Furthermore, it can be provided that the cross section of the fluid channel is angular and/or that the fluid inlet and/or the fluid outlet in each case have a round cross section, in particular wherein the fluid channel is formed in one piece with the fluid inlet and/or the fluid outlet. The round cross section of the fluid inlet and/or of the fluid outlet makes an easy connection to external pipes possible. For this, it can be provided that corresponding connections or connection geometries are assigned to the fluid inlet and/or the fluid outlet, for example that the fluid inlet and/or the fluid outlet in each case have an external thread. The connections or connection geometries can be moulded directly on the fluid inlet and/or the fluid outlet. The angular, in particular rectangular, cross section of the fluid channel makes it possible for the bulk wave to be reflected preferably between the fluid-measuring module and the opposite fluid-side wall. In this respect, the angular, in particular rectangular, cross section makes a precise measurement possible.

The fluid housing comprises in particular the fluid channel and the fluid inlet and/or the fluid outlet, with the result that these components are formed in one piece with each other and are thus cost-effective to produce. In particular, a continuous change in the cross section of the fluid housing occurs in transition areas between the fluid inlet and the fluid channel or the fluid outlet and the fluid channel. As a result of this, pressure losses, which would impair the measurement, are correspondingly small.

The transition areas can be produced easily during the injection-moulding process.

In a further embodiment, it can be provided that the fluid housing comprises a measuring channel section which extends along an indentation in the fluid housing, in which the fluid-measuring module is arranged. The fluid-measuring module thus does not engender any fittings or edges in the fluid channel, by means of which the flow of the fluid could be impaired. The indentation comes about in particular during the production of the fluid housing, as the fluid-measuring module was previously inserted in the injection mould, with the result that the fluid housing is formed around the fluid-measuring module during the injection moulding.

According to an embodiment, a damping element is provided at least at one end of the fluid-measuring module. The damping element prevents an unintentional coupling of the surface acoustic wave into other components of the fluid meter. In addition, the damping element reduces or prevents undesired reflections, for example undesired reflections on the fluid housing.

According to an embodiment, it is provided that a plastic is used in order to injection-mould around the fluid-measuring module and to manufacture the fluid housing. Plastics are materials which are easy to handle and cost-effective to procure, which is why they are used in injection moulding. The use of plastic thus makes it possible to produce a cost-effective fluid housing.

Accordingly, it is provided in particular that the previously described fluid meter is produced with the described injection-moulding process.

DESCRIPTION OF THE DRAWINGS

Further features and advantages of the present disclosure are revealed by the following description of preferred embodiments and the drawings, to which reference is made. In the drawings there are shown in.

DETAILED DESCRIPTION

The flow direction is represented with arrows by way of example in all figures. However, it is also conceivable that the flow direction points in the other direction.

Figure 1:
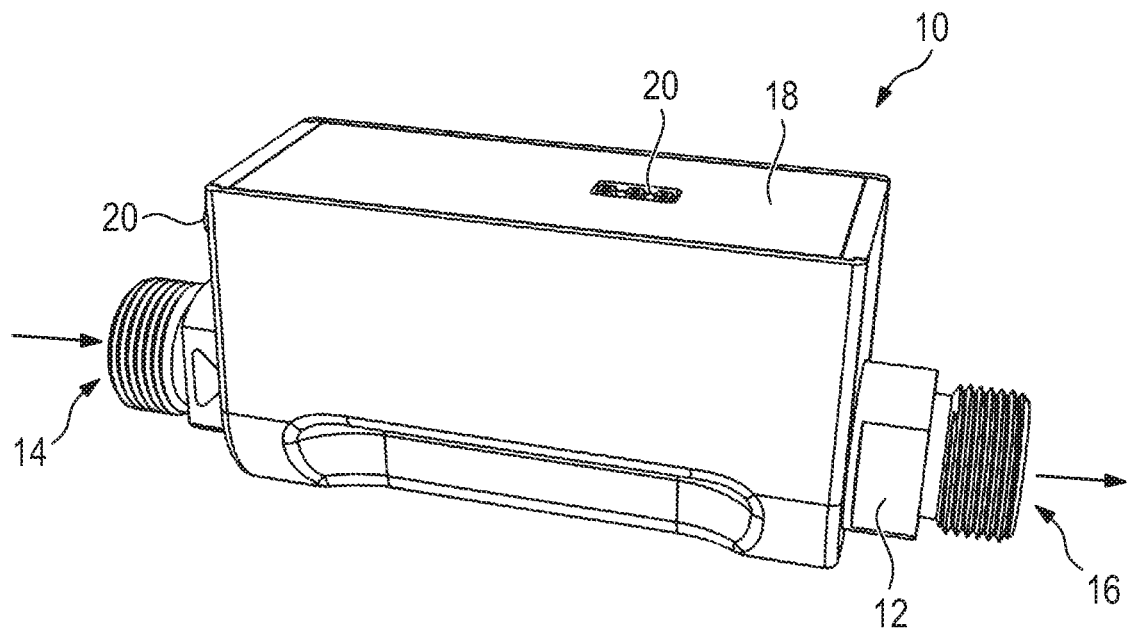
FIG. 1 a first embodiment of a fluid meter according to the present disclosure in a perspective view, FIG. 2 a longitudinal sectional representation of the fluid meter from FIG. 1, FIG. 3 a cross-sectional representation of the fluid meter from FIG. 1, FIG. 4 a longitudinal sectional representation of a part of a channel-like insert unit which can be used in a fluid meter according to the present disclosure, and FIG. 5 a cross-sectional representation of a fluid meter according to the present disclosure according to a second embodiment.

A fluid meter 10 according to a first embodiment is to be seen from the outside in FIG. 1, with a fluid housing 12, a fluid inlet 14 and a fluid outlet 16. The fluid housing 12 is produced from a plastic and surrounded by an electronics housing 18, which is likewise produced from a plastic. In particular, the fluid housing 12 and the electronics housing 18 can be formed in one piece and/or material-bonded with each other, namely in one production step.

Figure 2:
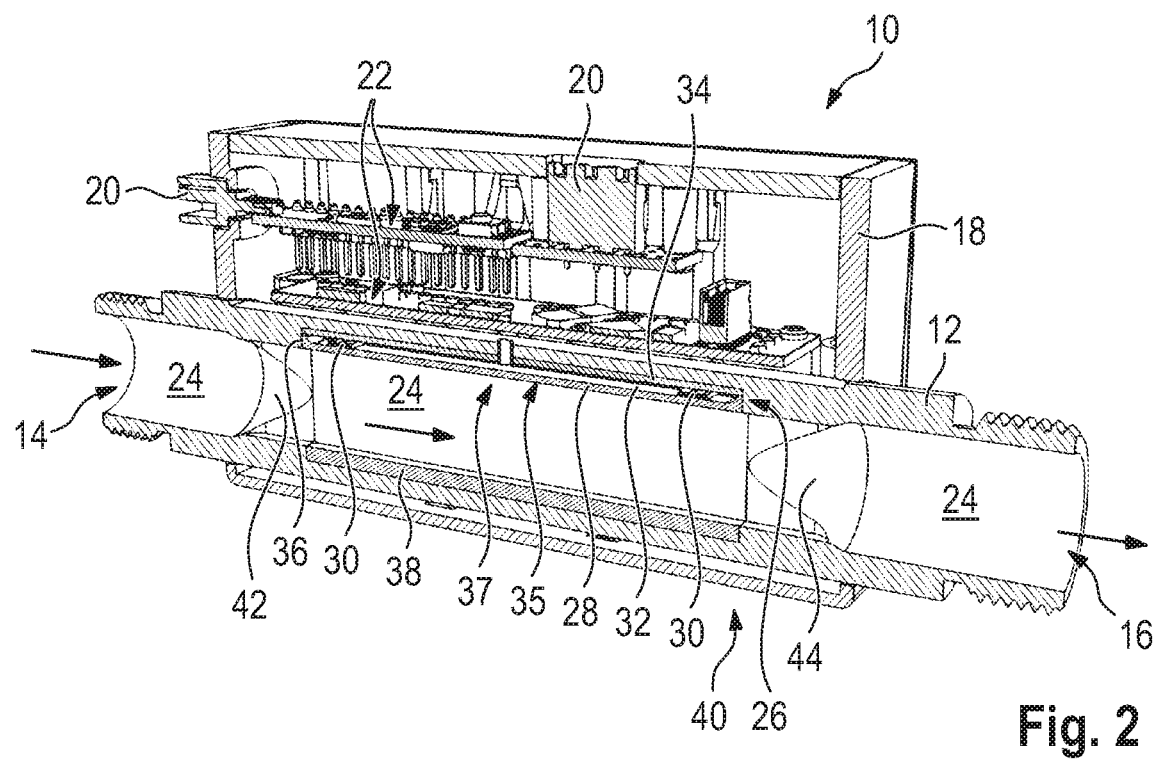

The electronics housing 18 has, on the outside, at least one electrical interface 20, in order to be able, for example, to contact electronics 22 of the fluid meter 10 inside the electronics housing 18, as revealed among other things by FIG. 2. For example, the electronics 22 inside the electronics housing 18 can be actuated via the electrical interface 20. For this, the electronics 22 are connected to the electrical interfaces 20.

In the embodiment shown, two electrical interfaces 20 are provided on the electronics housing 18, as is to be seen in FIG. 1.

It is also conceivable that the electrical interface 20 is formed via a wireless technology, thus a wireless communications interface.

The fluid housing 12 comprises a fluid channel 24, through which a fluid can flow, of which a characteristic property is to be measured with the fluid meter 10, as is yet to be explained below.

The fluid channel 24 is fluidically coupled both to the fluid inlet 14 and to the fluid outlet 16. In other words, the fluid inlet 14 represents the start of the fluid channel 24 and the fluid outlet 16 represents the end of the fluid channel 24.

The fluid meter 10 in addition comprises a fluid-measuring module 26, with which the characteristic property of the fluid can be measured, as is yet to be explained below.

The fluid-measuring module 26 comprises an, in particular metallic, base body 28, at least one acoustic signal transformer 30, a cavity 32 and a cover 34. The cavity 32 is formed between the base body 28 and the cover 34, wherein the at least one acoustic signal transformer 30 is arranged in the cavity 32. A vacuum/negative pressure can be present in the cavity 32. The cavity 32 can also be filled with a gas or gas mixture, for example air.

In the embodiment shown, the fluid-measuring module 26 comprises two signal transformers 30, which are arranged in the cavity 32.

The base body 28, with a side of a wall assigned to the fluid channel 24, directly contacts the fluid flowing through the fluid channel 24, with the result that the side of the wall forms a fluid-side interface 35 of the fluid-measuring module 26, in particular of the base body 28. The fluid-measuring module 26 directly adjoins the fluid which flows through the fluid channel 24 via the fluid-side interface 35 of the fluid-measuring module 26.

The at least one acoustic signal transformer 30 is arranged on the side of the wall of the base body 28 opposite the fluid-side interface 35, with the result that it cooperates with the wall of the base body 28 which forms the fluid-side interface 35.

The fluid-measuring module 26 is equipped to generate surface acoustic waves O, which propagate along the fluid-side interface 35 of the fluid-measuring module 26, as is yet to be explained below. In this respect, the fluid-measuring module 26 can also be called a SAW module.

The fluid-measuring module 26 is in particular a prefabricated unit.

FIG. 1 furthermore reveals that the fluid-measuring module 26 is arranged in an indentation 36 in the fluid channel 24, with the result that the fluid-side interface 35 of the fluid-measuring module 26 is aligned with the areas of the fluid channel 24 between the fluid-measuring module 26 and the fluid inlet 14 or the fluid outlet 16, thus there are no changes in the flow cross section of the fluid channel 24. In particular, it is provided that the fluid-measuring module 26 does not entail any fittings which would influence the flow of the fluid in the fluid channel 24.

The section of the fluid channel 24 to which the fluid-measuring module 26 is assigned is also called the measuring channel section 37, as the measurement of the fluid inside the fluid channel 24 is effected in this section, as is yet to be explained below. The indentation 36 thus extends over the length of the measuring channel section 37.

The fluid channel 24 therefore comprises a measuring channel section 37 as well as two adjoining areas to the fluid inlet 14 or to the fluid outlet 16, which lead off from opposite ends of the measuring channel section 37.

In the embodiment shown, the fluid meter 10 in addition comprises a reflector insert 38, which is arranged on the side of the fluid channel 24 opposite the fluid-measuring module 26, as revealed by FIG. 2.

The reflector insert 38 serves to reflect signals emanating from the acoustic signal transformer 30, as is yet to be explained below, when the mode of operation of the fluid meter 10 is described.

To improve the reflectivity, the reflector insert 38 is for example manufactured from a metal.

Figure 3:
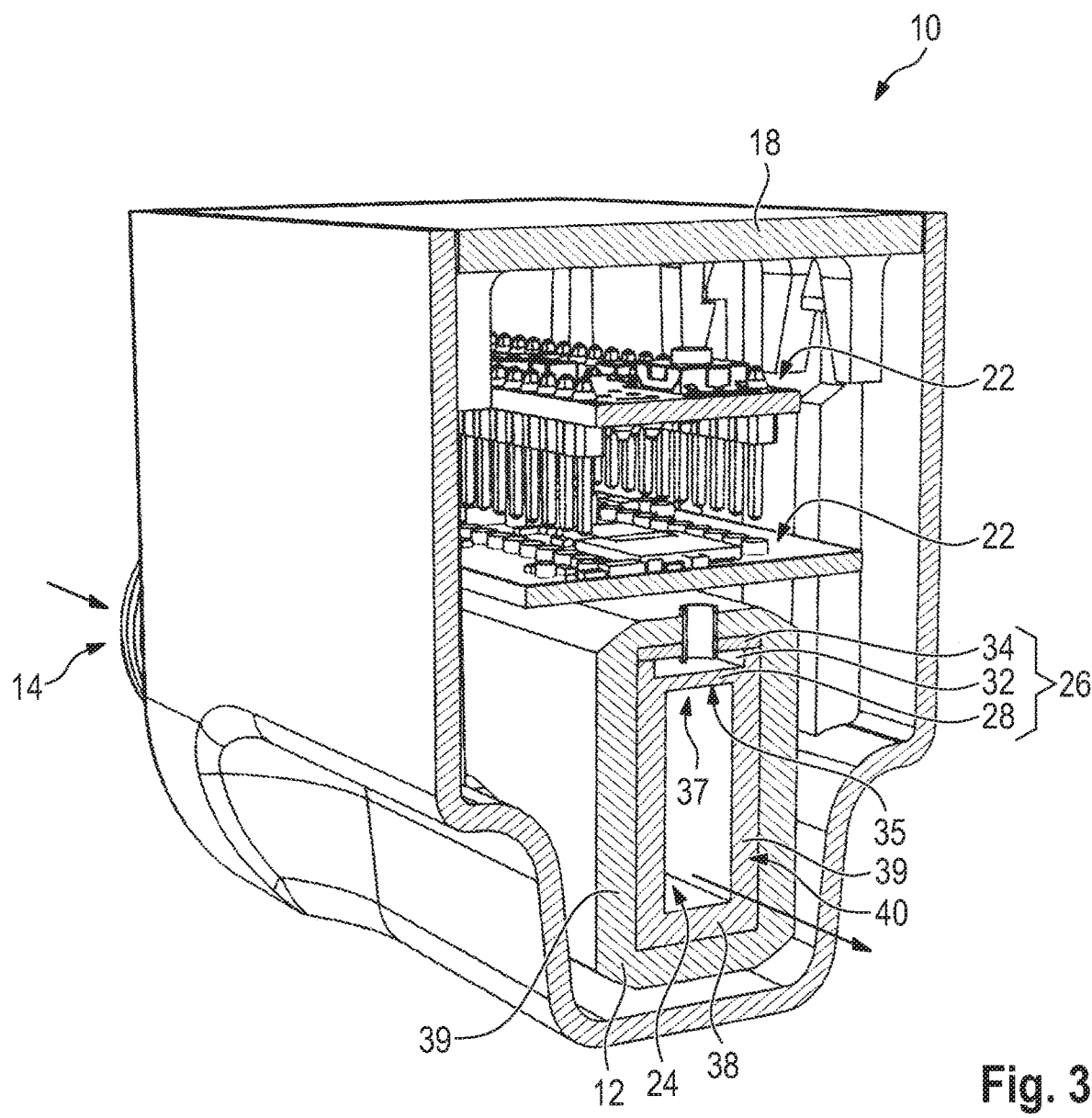

FIG. 3 reveals that the reflector insert 38 is connected in one piece to the base body 28 of the fluid-measuring module 26 via side walls 39 and forms a channel-like insert unit 40.

The channel-like insert unit 40 is designed angular in cross section, in particular rectangular.

The fluid inlet 14 and the fluid outlet 16 on the other hand have a round cross section, in order to make it possible to easily connect the fluid meter 10 to external (usually round) pipes, in particular via a thread such as an external thread.

A converging nozzle 42 or a diverging nozzle 44, which can also be called in each case a transition section, as they bring about a corresponding cross-sectional change in the fluid channel 24, are provided between the round cross sections of the fluid inlet 14 or of the fluid outlet 16 and the angular cross section of the channel-like insert unit 40.

In general, the transition sections, thus the converging nozzle 42 and the diverging nozzle 44, ensure that the different cross sections merge continuously into each other, thus the round cross sections of the fluid inlet 14 and of the fluid outlet 16 merge into the angular cross section of the fluid channel 24. Swirls and associated pressure losses which would influence the measurement result are hereby avoided. The converging nozzle 42 and the diverging nozzle 44 are preferably opposite each other, but are otherwise designed identical.

It can in addition be seen from FIGS. 2 and 3 that the fluid housing 12 surrounds the channel-like insert unit 40 and thus also the fluid-measuring module 26. In other words, the fluid-measuring module 26 or the channel-like insert unit 40 is enclosed in a fluid-tight manner by the fluid housing 12.

For this, it is provided that the fluid housing 12 is manufactured by injection-moulding around the fluid-measuring module 26, in particular the channel-like insert unit 40 comprising the fluid-measuring module 26, with the result that at least the fluid-measuring module 26 is embedded or integrated in a fluid-tight manner in the fluid housing 12. It is thereby guaranteed that the fluid can propagate only in the fluid channel 24 and does not enter the fluid-measuring module 26 or interspaces.

To produce the fluid meter 10, therefore, the fluid-measuring module 26 or the channel-like insert unit 40 comprising the fluid-measuring module 26 is first placed in an injection mould, wherein the plastic forming the fluid housing 12 is then injection-moulded around the fluid-measuring module 26 or the insert unit 40, with the result that the fluid-measuring module 26 or the insert unit 40 is accommodated or embedded in a fluid-tight manner in the fluid housing 12.

In other words, the fluid housing 12 is injection-moulded around the fluid-measuring module 26 or the insert unit 40.

In this respect, the fluid-measuring module 26 or the insert unit 40 is surrounded in a fluid-tight manner by the fluid housing 12 or accommodated integrated therein.

Figure 4:
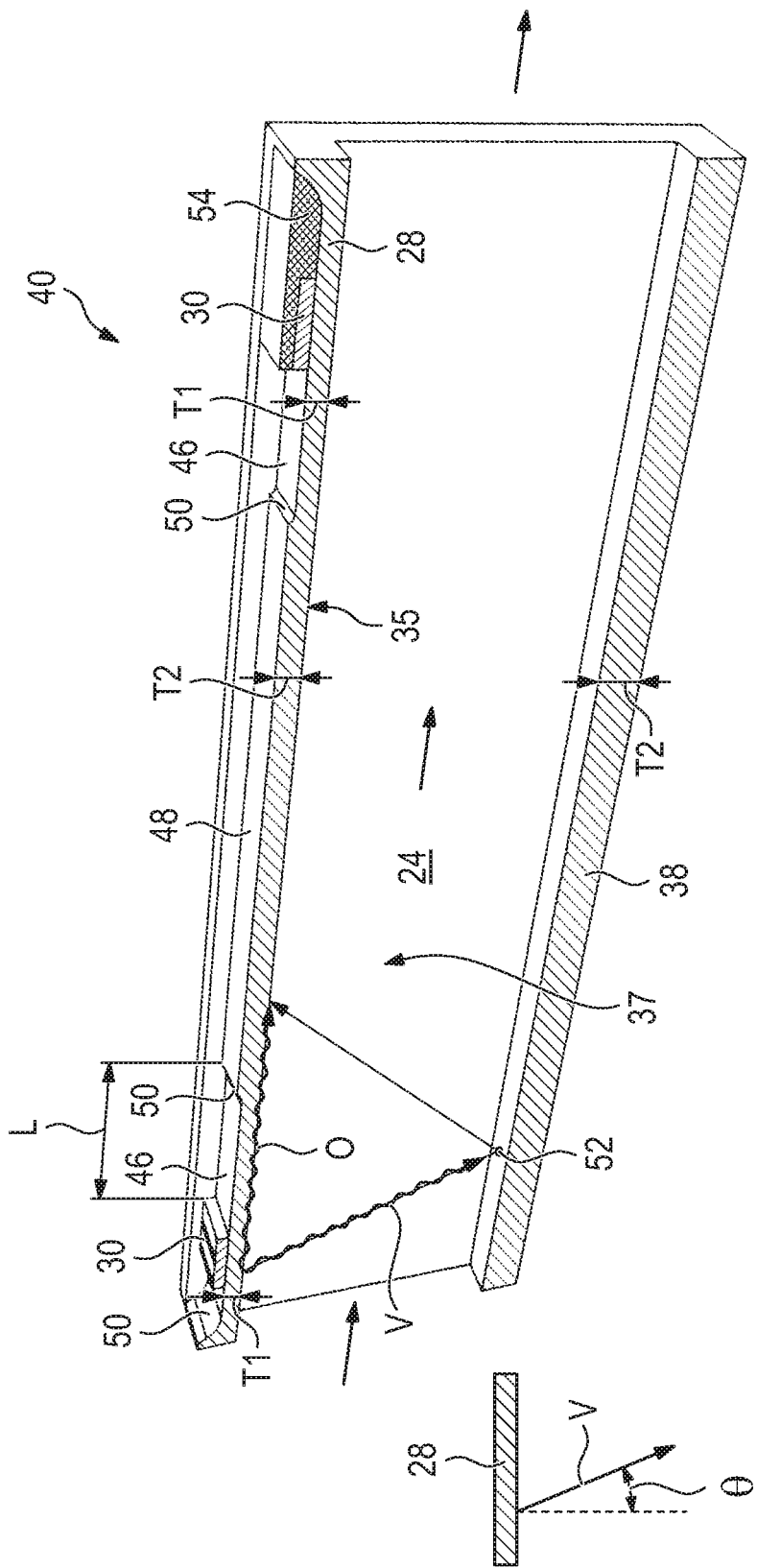

The mode of operation of the fluid meter 10 is explained below, wherein reference is made to FIG. 4, in which the fluid-measuring module 26 is shown in detail, in particular as part of the channel-like insert unit 40.

In principle, the base body 28 of the fluid-measuring module 26 comprises two areas, namely a coupling-in and/or coupling-out area 46 as well as a propagation area 48, which are formed by a characteristic first wall thickness T1 for the coupling-in and/or coupling-out area 46 and a characteristic second wall thickness T2 for the propagation area 48.

The coupling-in and/or coupling-out area 46 as well as the propagation area 48 are connected to each other via ramp-like transition areas 50 or merge into each other via the ramp-like transition areas 50, as they are formed during the injection moulding of the fluid housing 12.

In order to measure the characteristic properties of the fluid inside the fluid channel 24, the at least one acoustic signal transformer 30 excites surface acoustic waves O in the area of the coupling-in and/or coupling-out area 46, in particular directly underneath the acoustic signal transformer 30.

As already explained, two acoustic signal transformers 30 are provided in the embodiment shown. For example, one acoustic signal transformer 30 acts as transmitter and another signal transformer 30 acts as receiver.

However, it is also conceivable that only one acoustic signal transformer 30 is present and this is formed as transmitter and receiver at the same time, wherein the emitted surface acoustic waves O are reflected back correspondingly to the one acoustic signal transformer 30.

The surface acoustic waves O propagate along the fluid-side interface 35 of the base body 28. Because of the direct fluid-side interface 35 of the base body 28 of the fluid-measuring module 26 with the fluid, some of the energy of the surface acoustic waves O is coupled out into the fluid and from there runs at a specific propagation angle Θ (relative to a surface normal of the base body 28) as a bulk wave V through the fluid in the fluid channel 24, as shown schematically in FIG. 4.

If the fluid does not move in the fluid channel 24, the propagation angle Θ of the bulk wave V into the fluid results from the ratio of the sound velocity in the fluid $c_f$ to the sound velocity of the surface wave $c_w$ in the base body 28, as $$\Theta = \arcsin(c_f/c_w).$$

The angle Θ thus results from the "material pairing", wherein the sound velocity $c_w$ in the base body 28 must be different from the sound velocity $c_f$ in the fluid, so that a value different from zero results, below which the surface wave O couples into the fluid and covers a spatial distance therein as a bulk wave V.

The surface acoustic waves include, among others, Lamb waves, Rayleigh waves or leaky Rayleigh waves, which can be used here among other things.

On the opposite side of the fluid channel 24 the bulk wave V strikes the reflector insert 38 in a first reflection point 52 and is there reflected back in the direction of the base body 28. There, the bulk wave V strikes the propagation area 48 with the second wall thickness T2, which ensures a good reflection of the bulk wave V, with the result that the bulk wave V is again reflected in the direction of the reflector insert 38, and so on.

In this way, the bulk wave V propagates over a correspondingly long course in the fluid, which correspondingly improves the measurement.

As soon as the bulk wave V on the base body 28 again strikes the coupling-in and/or coupling-out area 46, the bulk wave V is again coupled out, thus converted into a surface acoustic wave O, which is received by the at least one acoustic signal transformer 30.

The at least one acoustic signal transformer 30 in addition receives the surface acoustic wave O, in order to determine from it an interference or an interference signal, in particular a transit time lag of the original surface acoustic wave O and the surface acoustic wave O coupled back in.

The transit time lag between the surface acoustic wave O and the surface acoustic wave O emitted by the acoustic signal transformer 30 allows conclusions as to characteristic properties of the fluid, such as its concentration, viscosity, sound velocity, flow rate, flow, temperature and/or homogeneity.

In order that the energy transfer into the fluid functions well, the wall thickness of the coupling-in and/or coupling-out area 46 lies within a defined range of sizes which is dependent on the wavelength Λ of the surface acoustic wave O.

For this, the wall of the base body 28 which forms the fluid-side interface 35 has the first wall thickness T1, which is smaller than or equal to the wavelength Λ of the surface acoustic wave O, here preferably is 50% of the wavelength Λ of the surface acoustic wave O, in the area of the coupling-in and/or coupling-out area 46. The first wall thickness T1 in the coupling-in and/or coupling-out area 46 ensures that the generation of surface acoustic waves O and the conversion of bulk waves V back into surface waves O on the acoustic signal transformer 30 are particularly effective.

The wall area of the base body 28 with the first wall thickness T1 extends not only directly underneath the acoustic signal transformer 30, but additionally in an area between the acoustic signal transformer 30 and the propagation area 48.

This area of the coupling-in and/or coupling-out area 46 extends over a length L, which can correspond to 5 to 10 wavelengths Λ of the surface acoustic wave O. This makes it possible to couple the surface acoustic wave O into the base body 28 first and then into the fluid as a bulk wave V well in the area of the acoustic signal transformer 30.

Conversely, an area upstream of the acoustic signal transformer 30 with the first wall thickness T1 makes it easier to convert the bulk wave V into the surface wave O during the coupling-out of the bulk wave V.

On the other hand, the propagation area 48 and the reflector insert 38 have a second wall thickness T2, which differs from the first wall thickness T1, in the area of all reflection points of the bulk wave V. It can also be provided that the reflector insert 38 has a wall thickness different from the propagation area 48.

The second wall thickness T2 can be 20% to 95% larger than the first wall thickness T1, in the example shown it is approximately 50% larger than the first wall thickness T1. In the area with larger wall thickness T2 the surface waves O inside the base body 28 or the reflector insert 38 cannot propagate as well. Likewise, it is more difficult to excite a thicker wall of the base body 28 to form surface waves O. However, it can also be provided that the second wall thickness T2 is smaller than the first wall thickness T1, if the first wall thickness T1 is optimized for optimal coupling-in or coupling-out in the coupling-in and/or coupling-out area 46.

This means, conversely, that a better reflection of the bulk wave V at the reflection points is effected on the inside of the fluid-side interface 35 of the propagation area 48, because the coupling-in of the waves is made difficult there, at best even prevented entirely. The signal strength at the acoustic signal transformer 30 can thus be improved.

The number and position of the reflection points is given by the dimensions of the fluid channel 24 and the angle Θ. As the angle Θ is dependent on the flow rate of the fluid in the fluid channel 24 and the bulk wave V has a wide wave front, the areas with the second wall thickness T2 have large dimensions.

The acoustic signal transformer 30 is preferably formed as a piezoelectric transducer, in particular as an interdigital transducer, wherein the surface waves O in the base body 28 are generated by the application of an alternating voltage.

In addition, it can be provided that a damping element 54 is attached to the acoustic signal transformer 30. The damping element 54 prevents the surface acoustic wave O from unintentionally coupling into other components of the fluid meter 10. In addition, the damping element 54 reduces or prevents undesired reflections, for example undesired reflections on the fluid housing 12.

Figure 5:
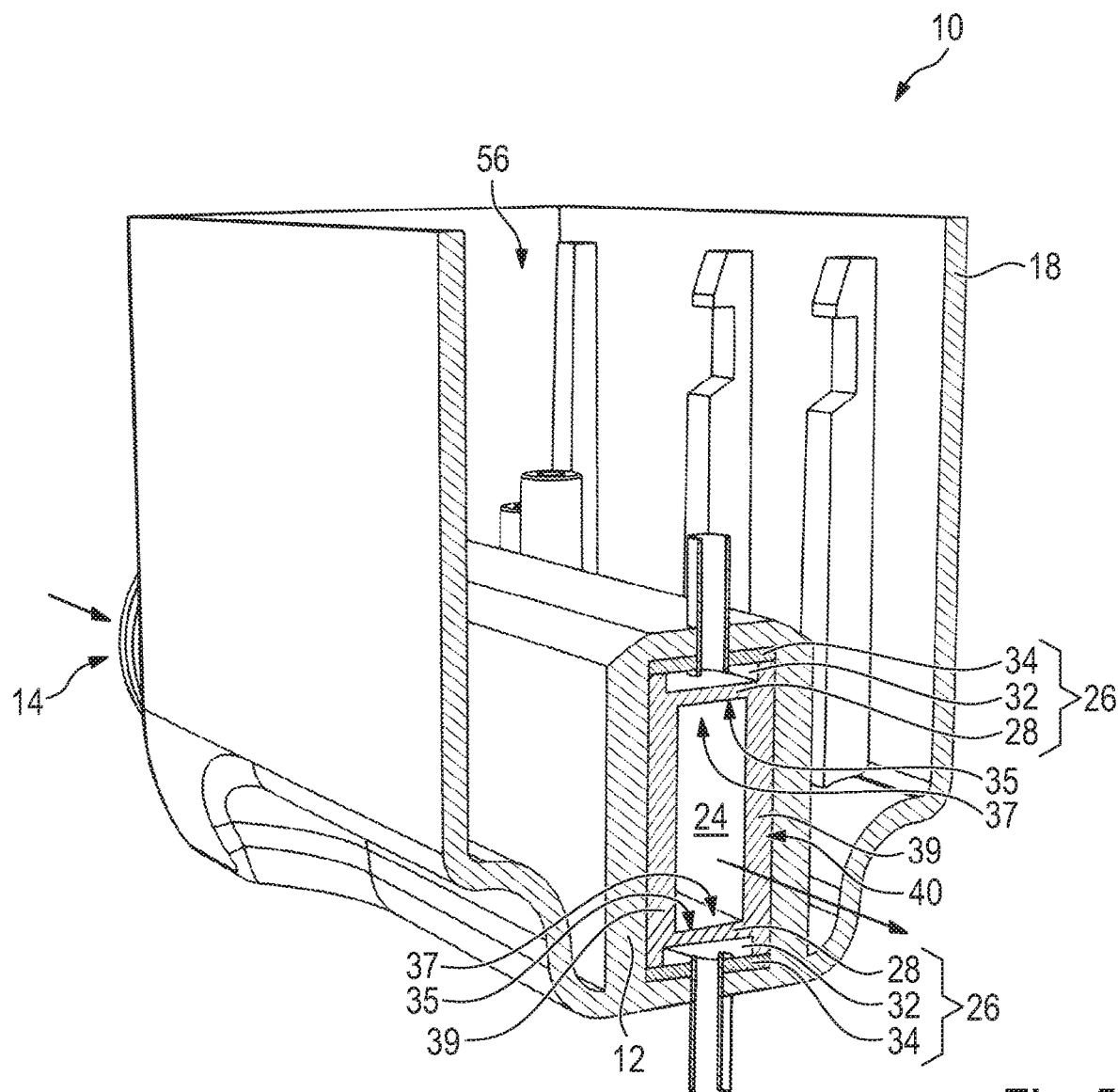

In FIG. 5, a second embodiment is shown which corresponds substantially to the first embodiment, with the result that only the differences will be discussed in the following. Identical and functionally identical components are provided with the same reference numbers.

In the second embodiment of the fluid meter 10 a second fluid-measuring module 26 is provided instead of the reflector insert 38. The characteristic properties of the fluid can thereby be measured with two fluid-measuring modules 26, in particular at the same time or redundantly. Synergistic effects can be achieved, as the surface acoustic waves O are formed on both sides of the fluid channel 24. Incorrect measurements or measurement artefacts can thus be recognized better and taken into account in the evaluation.

In principle, the fluid housing 12 can have a receiver 56, in which further modules such as evaluation electronics modules or the like can be housed. For example, a wireless communications unit could be accommodated in the receiver 56, via which the connection to the acoustic signal transformer 30 can be effected wirelessly for example.

It is also conceivable, for example, that a cover, not represented here, is attached adjoining the receiver 56 in order to create the storage space formed by the receiver 56 for further components of the fluid meter 10.

In particular, FIG. 5 reveals that the fluid housing 12 is formed in one piece with the electronics housing 18.

Of course, the different features of the embodiments can be combined with each other as desired. In particular, the features listed with respect to the second embodiment as differences are independent and can also be provided in various ways in the first embodiment.

The invention claimed is:

1. A fluid meter, comprising:
   a fluid housing, which comprises a fluid inlet, a fluid outlet, and a fluid channel which extends between the fluid inlet and the fluid outlet, and which is fluidically coupled to the fluid inlet and the fluid outlet,
   wherein the fluid housing is manufactured from a plastic and has a first inside surface facing the fluid channel, to which a fluid-measuring module is attached, the fluid-measuring module being in direct contact with a fluid flowing through the fluid channel at a fluid-side interface,
   wherein the fluid-measuring module comprises a metallic base body and is surrounded by the fluid housing,
   wherein the fluid-measuring module is equipped to generate surface acoustic waves which propagate along the fluid-side interface of the fluid-measuring module, and
   wherein the fluid channel comprises a measuring channel section, a first adjoining area to the fluid inlet, and a second adjoining area to the fluid outlet, wherein the first and second adjoining areas are at opposite ends of the measuring channel section, and wherein the fluid channel is limited by the fluid housing in the adjoining areas upstream and downstream of the fluid-measuring module.

2. The fluid meter according to claim 1, wherein the fluid-measuring module has at least one acoustic signal transformer, which is equipped to at least one of emit and measure the surface acoustic wave and a bulk wave.

3. The fluid meter according to claim 2, wherein at least one reflection point for the bulk wave (V) is provided on an inner wall of the fluid channel.

4. The fluid meter according to claim 2, wherein the fluid-measuring module has a cavity, in which the acoustic signal transformer is arranged.

5. The fluid meter according to claim 2, wherein the fluid-measuring module has a reduced wall thickness in an area of the acoustic signal transformer.

6. The fluid meter according to claim 1, wherein the fluid housing is an injection-moulded part.

7. The fluid meter according to claim 1, wherein the fluid-measuring module is accommodated in a fluid-tight manner in the fluid housing.

8. The fluid meter according to claim 1, wherein the fluid housing is injection-moulded around the fluid-measuring module.

9. The fluid meter according to claim 1, wherein at least one of a reflector insert and a further fluid-measuring module is provided on a second inside surface of the fluid channel opposite the fluid-measuring module.

10. The fluid meter according to claim 9, wherein at least one of the reflector insert and the further fluid-measuring module is also surrounded by the fluid housing.

11. The fluid meter according to claim 9, wherein the fluid-measuring module, together with at least one of the reflector insert and the further fluid-measuring module, forms a channel-like insert unit.

12. The fluid meter according to claim 9, wherein the fluid-measuring module is connected to at least one of the reflector insert and the further fluid-measuring module by two side walls.

13. The fluid meter according to claim 1, wherein a cross section of the fluid channel is angular and/or wherein the fluid inlet and the fluid outlet in each case have a round cross section.

14. The fluid meter according to claim 1, wherein the fluid channel is formed in one piece with at least one of the fluid inlet and the fluid outlet.

15. The fluid meter according to claim 1, wherein the fluid housing comprises a measuring channel section, which extends along an indentation in the fluid housing, in which the fluid-measuring module is arranged.

16. The fluid meter according to claim 1, wherein a damping element is provided at least at one end of the fluid-measuring module.

17. A fluid meter, comprising:
   a fluid housing, which comprises a fluid inlet, a fluid outlet, and a fluid channel which extends between the fluid inlet and the fluid outlet, and which is fluidically coupled to the fluid inlet and the fluid outlet,
   wherein the fluid housing has an inside surface facing the fluid channel, to which a fluid-measuring module is attached, the fluid-measuring module being in direct contact with a fluid flowing through the fluid channel at a fluid-side interface,
   wherein the fluid-measuring module is surrounded by the fluid housing, wherein the fluid-measuring module is a prefabricated unit comprising a metallic base body, the fluid housing being injection-moulded around the fluid-measuring module, and
   wherein the fluid-measuring module is equipped to generate surface acoustic waves which propagate along the fluid-side interface of the fluid-measuring module.

18. A fluid meter, comprising:
a fluid housing, which comprises a fluid inlet, a fluid outlet, and a fluid channel which extends between the fluid inlet and the fluid outlet, and which is fluidically coupled to the fluid inlet and the fluid outlet,
wherein the fluid housing is manufactured from a plastic and has an inside side surface facing the fluid channel, to which a fluid-measuring module is attached, the fluid-measuring module being in direct contact with a fluid flowing through the fluid channel at a fluid-side interface,
wherein the fluid-measuring module comprises a metallic base body and is surrounded by the fluid housing,
wherein the fluid-measuring module is equipped to generate surface acoustic waves which propagate along the fluid-side interface of the fluid-measuring module,
wherein the fluid-measuring module has at least one acoustic signal transformer, which is equipped to emit and/or measure the surface acoustic wave and a bulk wave, and
wherein the fluid-measuring module is accommodated in a fluid-tight manner in the fluid housing as the fluid housing is an injection-moulded part that was injection-moulded around the fluid-measuring module such that the acoustic signal transformer is protected against damage due to fluid entering.

* * * * *